(12) United States Patent
Darby

(10) Patent No.: US 10,104,964 B2
(45) Date of Patent: *Oct. 23, 2018

(54) SUPPORTING AN OBJECT AT A WINDOW OF A BUILDING BY APPLYING OPPOSING FORCES TO AN INTERIOR SURFACE AND AN EXTERIOR SURFACE OF THE BUILDING

(71) Applicant: Nation Wide Products LLC, Abilene, TX (US)

(72) Inventor: Jason Darby, Abilene, TX (US)

(73) Assignee: Nation Wide Products LLC, Abilene, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,703

(22) Filed: Nov. 10, 2015

(65) Prior Publication Data

US 2016/0058189 A1  Mar. 3, 2016

Related U.S. Application Data

(63) Continuation of application No. 13/958,453, filed on Aug. 2, 2013, now Pat. No. 9,179,794.

(51) Int. Cl.
| | |
|---|---|
| *F24F 13/32* | (2006.01) |
| *A47B 95/00* | (2006.01) |
| *A47H 27/00* | (2006.01) |
| *E06B 7/28* | (2006.01) |
| *A47B 47/00* | (2006.01) |
| *A47B 96/02* | (2006.01) |

(52) U.S. Cl.
CPC .......... *A47B 95/00* (2013.01); *A47B 47/0058* (2013.01); *A47B 96/025* (2013.01); *A47H 27/00* (2013.01); *E06B 7/28* (2013.01); *F24F 13/32* (2013.01); *Y10T 29/49826* (2015.01)

(58) Field of Classification Search
CPC . A47H 27/00; E06B 7/28; F24F 13/32; Y10T 29/49826; A01K 1/0353; A47L 3/02; E04G 23/00; E04G 5/00; F16M 13/02; F16M 11/10
USPC ........................................................ 248/236
See application file for complete search history.

(56) References Cited

U.S. PATENT DOCUMENTS

| 194,718 A | 8/1877 | Palmer |
|---|---|---|
| 274,334 A | 3/1883 | Hurley |
| (Continued) | | |

OTHER PUBLICATIONS

International Search Report and Written Opinion issued for PCT/US2013/062412, dated Feb. 25, 2014, 8 pages.

*Primary Examiner* — Nkeisha Smith
(74) *Attorney, Agent, or Firm* — Norton Rose Fulbright US LLP

(57) ABSTRACT

An apparatus for supporting an object at a window of a building comprises a first member, a second member, and a third member. The first member extends along at least a partial width of the window and abuts an interior surface of the building. The first member is configured to support the object by exerting an outward force on the interior surface of the building in response to a downward force exerted by the object. The first member also comprises at least two sections extending from the interior of the building to the exterior of the building. These sections may extend from the interior of the building to the exterior of the building about respective distal ends of the first member. The sum of the forces applied on the surfaces of the building are sufficient to secure the object to the building.

8 Claims, 2 Drawing Sheets

(56) References Cited

U.S. PATENT DOCUMENTS

| | | |
|---|---|---|
| 399,491 A | 3/1889 | Bukawietis |
| 430,971 A | 6/1890 | Reed |
| 495,810 A | 4/1893 | Iseminger |
| 593,501 A | 11/1897 | Timmis |
| 652,010 A | 6/1900 | Wheeler |
| 660,174 A | 10/1900 | Tischer |
| 795,451 A | 7/1905 | Rice |
| 798,683 A | 9/1905 | Ketteman |
| 800,585 A | 9/1905 | Maxam |
| 823,921 A | 6/1906 | Christofferson et al. |
| 829,537 A | 8/1906 | Mills |
| 844,148 A | 2/1907 | Leger |
| 917,175 A | 4/1909 | Smith |
| 999,897 A | 8/1911 | Smith |
| 1,142,596 A | 6/1915 | Mangisch |
| 1,209,839 A | 12/1916 | Hokenson |
| 1,261,513 A | 4/1918 | Green |
| 1,275,053 A | 8/1918 | Leiding |
| 1,321,869 A | 11/1919 | Wilson |
| 1,336,283 A | 4/1920 | John |
| 1,512,792 A | 10/1924 | Nelson |
| 1,517,585 A | 12/1924 | Richardson |
| 1,518,091 A | 12/1924 | Mathis et al. |
| 1,531,159 A | 3/1925 | Timmons |
| 1,558,977 A | 10/1925 | Gray |
| 1,601,471 A | 9/1926 | Fowler |
| 1,614,719 A | 1/1927 | Dabney |
| 1,625,423 A | 4/1927 | Peckenpaugh |
| 1,627,241 A | 5/1927 | Johnson |
| 1,658,942 A | 2/1928 | Renstrom |
| 1,663,279 A | 3/1928 | Portt |
| 1,679,961 A | 8/1928 | Embrey |
| 1,701,301 A | 2/1929 | Goodwin |
| 1,733,485 A | 10/1929 | Desrosiers |
| 1,823,771 A | 9/1931 | Thrasher |
| 1,894,878 A | 1/1933 | La Grange |
| 1,949,820 A | 3/1934 | Timmons |
| 1,955,223 A | 4/1934 | Brouyette |
| 1,957,184 A | 5/1934 | Smith |
| 2,037,438 A | 4/1936 | Roth |
| 2,049,353 A | 7/1936 | Cary |
| 2,059,115 A | 10/1936 | Kay |
| 2,059,739 A | 11/1936 | Ment et al. |
| 2,116,427 A | 5/1938 | Duncan |
| 2,219,642 A | 10/1940 | Whiteman |
| 2,240,635 A | 5/1941 | Avins |
| 2,273,370 A | 2/1942 | Oberti |
| 2,291,430 A | 7/1942 | Ingersoll |
| 2,292,379 A | 8/1942 | Jirasek |
| 2,381,810 A | 8/1945 | Eldwood |
| 2,444,746 A | 7/1948 | Newbold |
| 2,464,666 A | 3/1949 | Bishop |
| 2,568,968 A | 9/1951 | Perrin |
| 2,583,613 A | 1/1952 | Talbott |
| 2,678,243 A | 5/1954 | Masse |
| 2,717,139 A | 9/1955 | Jewell |
| 2,736,615 A | 2/1956 | Gormley |
| 2,758,456 A | 8/1956 | Wheeler |
| 2,891,754 A | 6/1959 | Kuhlenschmidt et al. |
| 2,880,952 A | 8/1959 | Moore et al. |
| 2,935,284 A | 5/1960 | Reeves |
| 3,010,534 A | 11/1961 | Borke |
| 3,257,933 A | 6/1966 | Baylinson |
| 3,273,843 A | 9/1966 | Bell, Jr. |
| 3,394,910 A | 7/1968 | Ulich |
| 3,415,481 A | 12/1968 | Greenfield |
| 3,433,443 A | 3/1969 | Mangan et al. |
| 3,727,721 A | 4/1973 | Kulesa |
| 3,833,196 A | 9/1974 | Protzman |
| 3,857,365 A | 12/1974 | Mueller |
| 4,445,459 A | 5/1984 | Julie |
| 4,613,104 A | 9/1986 | Garrott |
| D288,570 S | 3/1987 | Fonceca |
| 4,869,451 A | 9/1989 | Gordon |
| 5,112,015 A | 5/1992 | Williams |
| 5,203,426 A | 4/1993 | Sydnor |
| 5,337,697 A | 8/1994 | Trimarchi et al. |
| 5,347,787 A | 9/1994 | Gavin |
| 5,613,406 A | 3/1997 | Rutkowski |
| 5,636,816 A | 6/1997 | Burton et al. |
| 5,738,319 A | 4/1998 | Grassi |
| 5,823,289 A | 10/1998 | Csomos |
| 5,967,478 A | 10/1999 | Tynes |
| 6,052,918 A | 4/2000 | Oletzke |
| 6,233,877 B1 | 5/2001 | Monroe |
| 6,367,750 B1 | 4/2002 | Ford |
| 6,731,250 B1 | 5/2004 | Berman |
| 6,767,278 B1 | 7/2004 | Peterson |
| 7,237,687 B1 | 7/2007 | Abdi et al. |
| 7,572,073 B2 | 8/2009 | Kenoyer et al. |
| 7,735,800 B2 | 6/2010 | Lunato et al. |
| 7,753,334 B2 | 7/2010 | Schreiber |
| 7,874,529 B2 | 1/2011 | Klemm et al. |
| 7,967,360 B2 | 6/2011 | Holden et al. |
| 8,091,844 B2 | 1/2012 | Bragg |
| 8,167,260 B2 | 5/2012 | Boccia et al. |
| 8,533,955 B2 | 9/2013 | Agnihotri |
| 8,584,998 B1 | 11/2013 | Peterson |
| 8,657,131 B2 | 2/2014 | Pixler |
| 2005/0224433 A1 | 10/2005 | Heneveld, Sr. |
| 2008/0185353 A1 | 8/2008 | Immerman et al. |
| 2010/0270448 A1 | 10/2010 | Boccia et al. |
| 2011/0056765 A1 | 3/2011 | Enriquez |
| 2012/0137499 A1 | 6/2012 | Agnihotri |
| 2013/0228536 A1 | 9/2013 | Crowley |

SUPPORTING AN OBJECT AT A WINDOW OF A BUILDING BY APPLYING OPPOSING FORCES TO AN INTERIOR SURFACE AND AN EXTERIOR SURFACE OF THE BUILDING

CROSS-REFERENCE TO RELATED APPLICATIONS

The present application is a continuation of U.S. patent application Ser. No. 13/958,453, filed Aug. 2, 2013 and entitled "SUPPORTING AN OBJECT AT A WINDOW OF A BUILDING BY APPLYING OPPOSING FORCES TO AN INTERIOR SURFACE AND AN EXTERIOR SURFACE OF THE BUILDING," and is related to co-pending, commonly assigned U.S. patent application Ser. No. 14/226,448, filed Mar. 26, 2014 and entitled "SUPPORTING AN OBJECT AT A WINDOW OF A BUILDING BY APPLYING OPPOSING FORCES TO AN INTERIOR SURFACE AND AN EXTERIOR SURFACE OF THE BUILDING," the disclosures of which are incorporated by reference herein in their entirety.

BACKGROUND

Objects such as air conditioning units, plants, animal food and housing, decorative arrangements, and the like, are often secured adjacent to or partially within building windows, where a portion of those objects are located outside of the building. Since a portion of the object is located beyond the exterior of a building, there exists a potential for an object to fall from the window to the surface below. Of course, this is particularly problematic in urban areas, where several of such objects may be found in a single building, several stories above the ground surface.

As a result, strict safety regulations have been developed in some urban areas with regard to the installation and maintenance of, e.g., window air conditioning units. For example, the New York City Building Code sets forth specific guidelines that must be adhered to when such a unit is installed. Further, to date, air conditioners and other objects have been attached to a building utilizing support structures that are built into the building itself. As such, if the support system falters or is removed, the building is permanently altered or damaged. Therefore, a need exists for an object support apparatus that provides sufficient safety and does not damage or otherwise modify the building to which is secured.

BRIEF DESCRIPTION OF THE DRAWINGS

For a more complete understanding of the present invention, reference is now made to the following description taken in conjunction with the accompanying drawings, in which.

DETAILED DESCRIPTION

Figure 1:
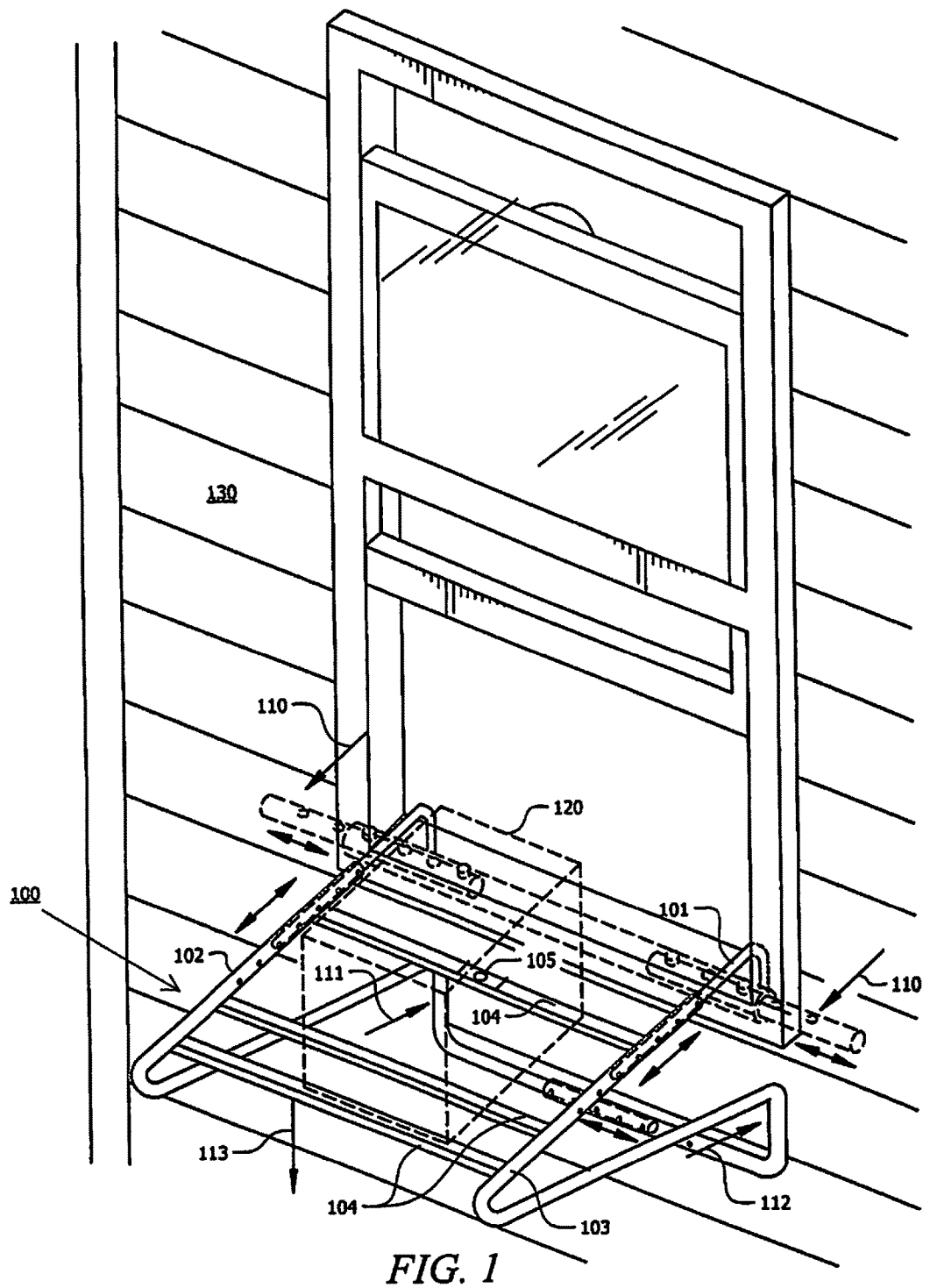
FIG. 1 illustrates an embodiment of an apparatus for supporting an object at a window of a building according to the inventive concepts described herein.

Embodiments described herein provide systems, apparatuses, and methods for supporting various objects about a window of a building while complying with municipal ordinances and other applicable safety requirements and not requiring any modification and/or damage to the building or window itself. Such objects include air conditioning units, plants, animal food and housing, decorative arrangements, and the like.

According to an embodiment, an apparatus for supporting an object at a window of a building comprises a first member, a second member, and a third member. The first member extends along at least a partial width of the window and abuts an interior surface of the building. The first member is configured to support the object by exerting an outward force on the interior surface of the building in response to a downward force exerted by the object. The first member also comprises at least two sections extending from the interior of the building to the exterior of the building. These sections may extend from the interior of the building to the exterior of the building about respective distal ends of the first member.

The second member is coupled to one of first member sections extending from the interior of the building to the exterior of the building. Also, the second member is configured to support the object by exerting an inward force on an exterior surface of the building in response to the downward force exerted by the object.

The third member is coupled to another of the first member sections extending from the interior of the building to the exterior of the building. Similar to the configuration of the second member, the third member is also configured to support the object by exerting an inward force on the exterior surface of the building in response to the downward force exerted by the object.

The sum of the outward force extorted by the first member on the interior surface of the building and the inward forces exerted by the second member and the third member on the exterior surface of the building are sufficient to oppose the downward force of the object. In other words, the sum of the outward force exerted by the first member on the interior surface of the building and the inward forces exerted by the second member and the third member on the exterior surface of the building are sufficient to support the object at the window.

Each of the first, second, and third members may be reversibly coupled to one another. That is, according to some embodiments, the first member is reversibly coupled to each of the second member and the third member. Further, in other embodiments, the second member and the third member are reversibly coupled to one another, e.g., at some location along the length of the first member. The coupling mechanism may be adjustable such that the dimensions of the apparatus may be adjusted in terms of length, width, and height, to accommodate objects of different sizes. Each member may couple to the other via, e.g., a slideable adjustment mechanism.

According to another embodiment, an apparatus for supporting an object at a window of a building comprises a first member and a second member. Each of the first member and the second member comprise an interior section extending along at least a partial width of the window and abutting an interior surface of the building. The interior sections are configured to support the object by exerting an outward force on the interior surface of the building in response to a downward force exerted by the object. The first member and second member also comprise intermediate sections that extend from the interior section at the interior of the building to the exterior of the building. Further, the first member and second member comprise exteriors sections that extend from the intermediate sections and are configured to support the object by exerting an inward force on an exterior surface of the building in response to the downward force exerted by the object. The first and second members are coupled to one another at least at their respective interior sections and exterior sections.

Certain embodiments may be modular, comprising components that are of adjustable dimensions and configurations, being able to accommodate standard (albeit different) building dimensions and materials, window dimensions, and objects of various dimensions. This modularity also provides for easy packaging, assembly, and repair or flexible arrangement and use. Components of systems and apparatuses according to the inventive concepts are thought to advantageously comprise one or a combination of lightweight materials that impart sufficient strength such as, for example, steel, aluminum, or fiber-reinforced plastic, and the like. Accordingly, the entire weight of the object is supported by systems and apparatuses without modification and/or damage to the adjoining building.

FIG. 1 illustrates an embodiment of an apparatus for supporting an object at a window of a building according to inventive concepts described herein. According to the embodiment illustrated at FIG. 1, apparatus 100 comprises first member 101, second member 102, and third member 103. First member first member 101 is engaged with second member 102 and third member 103 at sections of first member 101 that extend from the interior of building 130 to the exterior of building 130 at each of its respective distal ends. First member 101 is configured to apply an outward force to an interior surface of building 130 in response to a downward force exerted by object 120 being supported by apparatus 100. The outward force exerted by first member 101 is illustrated by vector 110.

Second member 102 and third member 103 are each coupled to first member 101 and are configured to apply an inward force to the exterior surface of the building 130 in response to the downward force exerted by object 120. The inward force exerted by second member 102 is illustrated by vector 111 and the inward outward force exerted by third member 103 is illustrated by vector 112. As will be described in more detail, first member 101, second member 102, and third member 103 operate to secure object 120 to building 130 without requiring any damage and/or modification to building 130 while complying with stringent municipal ordinances and other applicable safety requirements.

First member 101 is configured to extend at least along a partial width of an aperture of a building, e.g., a window, and abut an interior surface of the building on either side of the window. In some embodiments, first member 101 may extend along the entire length of the window or beyond the width. First member 101 may reversibly engage second member 102 and third member 103 by various attachment mechanisms. By way of example, first member 101 may comprise one or more notches that are configured to accept corresponding protrusions from second member 102 and third member 103 (e.g., by virtue of a male and female arrangement). In any event, first member 101 and second member 102 may form an engaged position second member 102 and third member 103 such that each is locked with respect to one another and may later be maneuvered by a user to an unengaged position, so that each may be moved or separated from one another. The reversible engagement between first member 101 with second member 102 and third member 103 (whether by a fastener, removable pins, or aligned notches and/or grooves) is advantageous because it allows the dimension of apparatus 100 to be adjusted in terms of length, width, and height to accommodate objects 120 of different sizes and each may be folded with respect to one another for packaging, transport, and the like. With each member able to be packaged while being separated from every other member, packaging and transport costs are greatly reduced.

Optionally, a sealing member configured to seal the interior of building 130 from the exterior of building 130 may be formed around the sections of first member 101 extending from the interior of building 130 to the exterior of building 130 (or second member 102 and third member 103) and the surface of a window second member 102.

First member 101 is variable along the width of the window so that apparatus 100 may be utilized with windows of different widths. The adjustments should be sufficient to permit a width of first member 101 to be adjusted to exert sufficient outward force to the interior surface of building 130. In some embodiments, the width of first member 101 is adjusted so that first member 101 is sufficiently wider than a width of the window opening. According to one embodiment, first member 101 comprises a central portion and two telescoping distal portions, each of which may be actuated between a retracted and extended position to ensure a desired length. According to another embodiment, first member 101 may comprise two pieces, where one slides along the length of another to form a desired length. In either case, consistent with the discussion herein, the length may be fixed by a reversible fastener means, one or more securing pins or bolts, or a latch mechanism. Finally, a soft material, such as rubber or a rubber composite, may cover first member 101 to prevent damage to the interior surface and/or window surrounding.

Second member 102 and third member 103 extend from respective intermediate sections of first member 101 and support object 120 along their top surface. second member 102. The length of second member 102 and third member 103 may be adjusted to accommodate different objects 120 and building walls of different thickness. According to one embodiment, second member 102 and third member 103 may comprise and outer sleeve that slides along the length of the intermediate sections of first member 101 extending from the interior of building 130. In that case, the intermediate sections of member 101 may be thought of as inner sleeves, where its length of apparatus 100 is adjusted by sliding the intermediate sections of first member 101 and along the length second member 102 and third member 103. Length adjustments may be performed by aligning appropriate apertures in the inner sleeve and outer sleeve and inserting a securing pin or fastener through the aligned apertures. Length adjustments may also be performed by sliding the sleeves or segments along a series notches or grooves so that it each is seated in a desired notch or groove at the desired length.

Further, it should be appreciated that second member 102 and third member 103 (illustrated as a single component at FIG. 1) may, in fact, be configured with or comprise other structures that may be configured according to specific dimensions of object 120. For example, second member 102 and third member 103 may configured with two or more rods 104 or beams extending there between. The spacing between the multiple rods or beams 104 may be configured be a user to support the edges of object 120. Such a configuration is thought to be advantageous in that it will inhibit object 120 from becoming lopsided due to high winds, unbalanced weight, and the like.

The lower portions of second member 102 and third member 103 extend to building 130 at an angle from their top portions, i.e., where object 120 exerts a downward force illustrated by the vector 113. Accordingly, second member 102 and third member 103 structurally operate to resist the downward force exerted by object 120 that would otherwise cause object 120 to fall to the surface or rotate inward toward building 130. As such, second member 102 and third member 103 provide a supportive force, where the supportive force has at least a component perpendicular to the exterior surface of building 130, keeping object 120 separate from building 130. Further, first member 101 provides an equal, opposing supporting force perpendicular to the interior surface of building 130. In this way, first member 101, second member 102, and third member 103 restrain motion of object 120 with respect to building 130.

In one embodiment, second member 102 and 103 extend along the width of first member 101 along their lower distal ends are reversibly couple to one another. Second member 102 and third member 103 may be coupled along at a location aligned with the medial portion of first member 101. Similar to the previous discussion, each may be adjusted by sliding along their respective length, etc. In this way, the width of apparatus 101 may be varied.

The length of second member 102 and third member 103 and the angles at which each extend toward building 130 may vary according to different considerations. For example, 1) the orthogonal or near orthogonal distance from the surface of building 130 at which second member 102 and third member 103 meets first member 101, and/or 2) the distance below first member 101 at which second member 102 and third member 103 abuts the surface of building 130 may be varied. This may be done to accommodate objects of different lengths, city ordinances, applicable safety regulations, and the like. According to one embodiment, the distance from the surface of building 130 at which second member 102 and third member 103 couple with first member 101 may be varied by sliding the end of each along a series notches or grooves so that they may be seated in a desired notch or groove. According other embodiments, second member 102 and third member 103 can be adjusted along the length of intermediate sections of member 101 by nut and bolt combinations, screws, or a reversible fastening mechanism, such as adjustable clamping or biasing means. For example, according to one embodiment, second member 102 and third member 103 may be attached to second member intermediate section of first member 101 by a bolt or pin inserted through a pair of aligned apertures in each (defined through either the horizontal or vertical surfaces of each).

The lower distal ends of second member 102 and third member 103 that abut building 130 may be adjustable so that they remain flush against the surface of building 130 even where the angle of second member 102 and third member 103 change with respect to the surface of building 130. In one embodiment, each comprises an adhesive material that provides sufficient resistance to alter movement, holding 120) in a fixed position. According to another embodiment, the lower end of each may be in combination with or comprise a foot such as a resilient, vibration isolation pad secured thereto, which effectively serves as a "non-skid" pad.

As seen from the previous description, object 120 is supported along building 130 by virtue of the physical arrangement between first member 101, second member 102, and third member 103, because the physical arrangement of those components provides sufficient forces against both the interior and exterior surfaces of building 130 in response to the downward force exerted by object 120 on second member 102. As such, no further mechanical support is needed. Instead, by virtue of this arrangement, the surfaces of building 130 are leveraged to secure object 120 thereto. That is, according to the embodiment illustrated in FIG. 1, the downward force exerted by object 120 on apparatus 100 operates to bias first member 101 toward the interior wall of building 130. In doing so, the bias is of sufficient magnitude to hold first member 101 at a fixed position at the interior surface of building 130. Simultaneously, the downward force exerted by object 120 on apparatus 100 operates to bias second member 102 and third member 103 toward exterior surface of building 130. The bias is of sufficient magnitude to hold the lower distal ends of second member 102 and third member 103 at a fixed position at the exterior surface of building 130.

Apparatus 100 may further comprise level indicator 105, which includes a bubble floating in a liquid contained in an elongated, clear tube. The level indicator may also include a first line disposed across the tube toward the distal end thereof and a second line disposed across the tube toward the proximal end thereof. After placing object 120 in an initial position, reference may be made to level indicator 105. The angle of second member 102 and third member 103 may be adjusted as described above, until the floating bubble indicates that object 120 is at a desired angle with respect to building 130.

Figure 2:
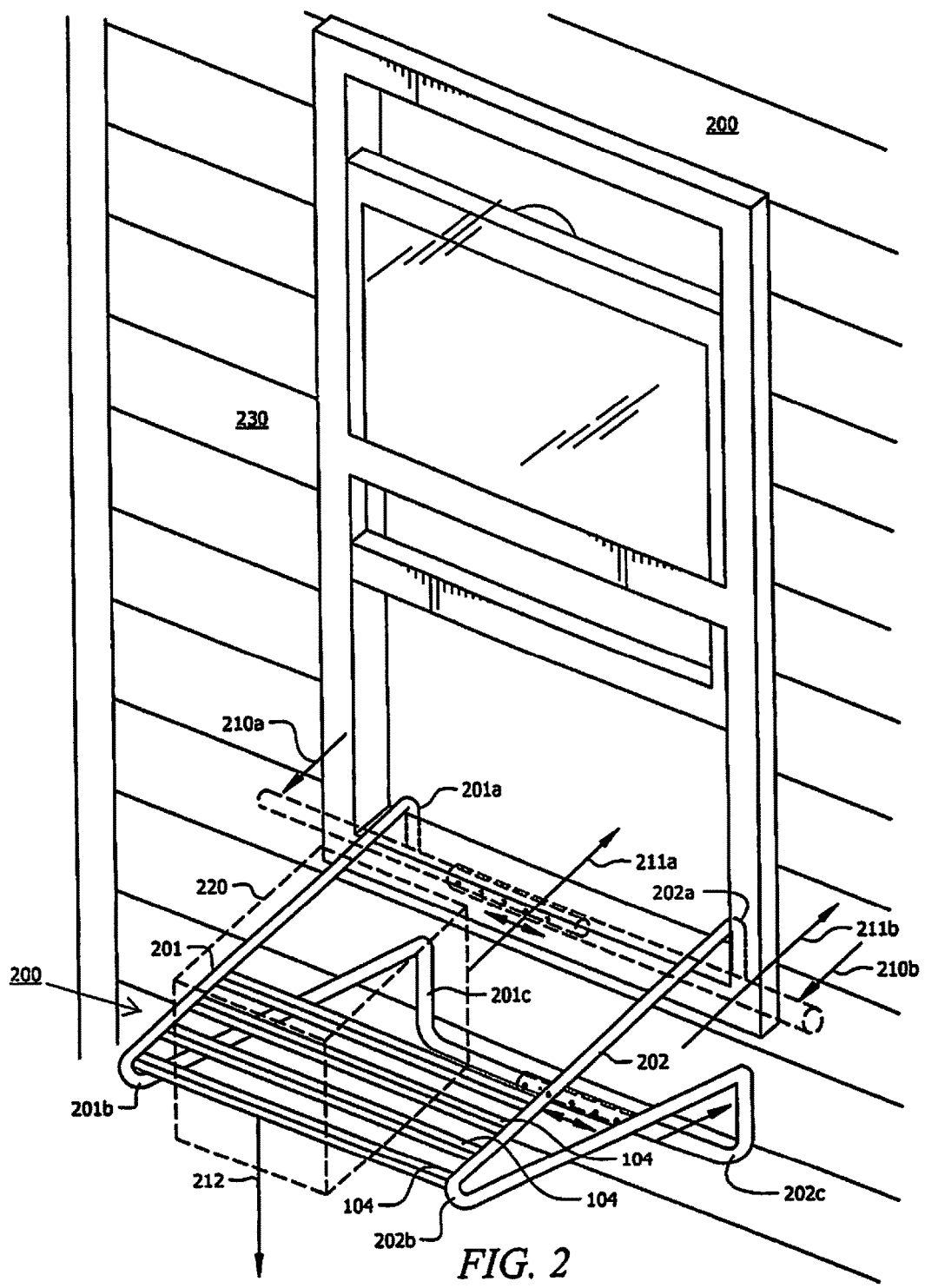
FIG. 2 illustrates another embodiment of an apparatus for supporting an object at a window of a building according to the inventive concepts described herein.

FIG. 2 illustrates another embodiment of an apparatus for supporting an object at a window of a building according to inventive concepts described herein. According to the embodiment illustrated at FIG. 2, apparatus 200 comprises first member 201 and second member 201. First member 201 comprises sections 201a, 201b, and 201c and second member 202 comprises 202a, 202b, and 202c.

Interior section 201a extends along at least a partial width of the window and abuts an interior surface of building 230. Interior section 201a supports object 120 by exerting an outward force on the interior surface of building 130 in response to a downward force exerted by object 220 on apparatus 200. The outward force exerted by interior section 201a is illustrated by vector 210a.

Intermediate section 201b extends from interior section 201a at the interior of building 130 to the exterior of building 230. Intermediate section 201b extends from interior section 201 at a distal end of interior section of 201a.

Exterior section 201c extends from intermediate section 201b and is configured to support object 220 by exerting an inward force on an exterior surface of building 130 in response to the downward force exerted by object 220. The inward force exerted by interior section 201c is illustrated by vector 211a.

Interior section 202a extends along at least a partial width of the window and abuts an interior surface of building 130. Interior section 202a supports object 220 by exerting an outward force on the interior surface of building 230 in response to a downward force exerted by object 220 on apparatus 200. The outward force exerted by interior section 202a is illustrated by vector 210b.

Intermediate section 202b extends from interior section 202a at the interior of building 130 to the exterior of building 230. Intermediate section 202b extends from interior section 202 at a distal end of interior section of 202a.

Exterior section 202c extends from intermediate section 202b and is configured to support object 220 by exerting an inward force on an exterior surface of building 230 in response to the downward force exerted by object 120. The inward force exerted by interior section 202c is illustrated by vector 211b.

First member 201 and second member 202 may be coupled to one another according to any number of mechanisms as discussed herein. According to a preferred embodiment, each are reversibly coupled to one another along their respective interior sections and exterior sections and slide or move with respect to one another to vary the dimensions of apparatus 200.

According to the operation of apparatus 200, the sum of the outward forces exerted by the interior sections of members 201 and 202 on the interior surface of building 230 and the inward forces exerted by the exterior sections of members 201 and 202 on the exterior surface of building 230 are sufficient to oppose the downward force of object 220. The downward force exerted by object 220 is illustrated by the vector 212. In other words, the sum of the outward forces exerted by the interior sections of members 201 and 202 on the interior surface of building 130 and the inward forces exerted by the exterior sections of members 201 and 202 on the exterior surface of building are sufficient to support object 220 at the window.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus that when placed at a window of a building supports an object at the window of the building, the apparatus comprising:
   a first member that, when placed at the window of the building, abuts an interior surface of the building and supports the object by exerting an outward force on the interior surface of the building in response to a downward force exerted by the object, where the first member comprises at least two sections extending from an interior of the building to an exterior of the building;
   a continuous second member, that when coupled to one of the at least two sections of the first member, supports the object by exerting an inward force on an exterior surface of the building in response to the downward force exerted by the object; and
   a continuous third member, that when coupled to another of the at least two sections of the first member, supports the object by exerting an inward force on the exterior surface of the building in response to the downward force exerted by the object;
   wherein the continuous second member and the continuous third member are configured to be coupled to one another at a location of the inward force exerted by the continuous second and third members;
   wherein continuous the second member and the continuous third member are configured to be coupled to the first member via a slideable adjustment mechanism that allows a distance the apparatus extends from the window to be adjusted.

2. The apparatus of claim 1 wherein, when the apparatus is placed at the window of the building and the object is placed on the apparatus, a sum of the outward force exerted by the first member on the interior surface of the building and the inward forces exerted by the continuous second member and the continuous third member on the exterior surface of the building are sufficient to oppose the downward force of the object.

3. The apparatus of claim 1 wherein, when the apparatus is placed at the window of the building and the object is placed on the apparatus, a sum of the outward force exerted by the first member on the interior surface of the building and the inward forces exerted by the continuous second member and the continuous third member on the exterior surface of the building are sufficient to support the object at the window.

4. The apparatus of claim 1 further comprising at least one support, that, when the apparatus is placed at the window of the building, extends between the continuous second member and the continuous third member and configured to further support the object.

5. An apparatus that when placed at a window of a building supports an object at the window of the building, the apparatus comprising:
   an adjustable first member that in an extended position extends beyond a width of the window on both sides of the window and abuts an interior surface of the building beyond both sides of the window in the extended position, where the adjustable first member, when placed at the window of the building, supports the object by exerting an outward force on the interior surface of the building beyond both sides of the window in response to a downward force exerted by the object, where the adjustable first member comprises a plurality of sections extending from an interior of the building to an exterior of the building;
   a continuous second member, that when coupled to a first of the plurality of sections of the adjustable first member supports the object in response to the downward force exerted by the object; and
   a continuous third member, that when coupled to another of the plurality of sections of the adjustable first member supports the object in response to the downward force exerted by the object;
   wherein the continuous second member and the continuous third member are configured to be coupled to one another at a location aligned about a medial portion of the adjustable first member;
   wherein the continuous second member and the continuous third member, when the apparatus is placed at the window of the building, are coupled to the adjustable first member via a slideable adjustment mechanism.

6. The apparatus of claim 5 wherein, when the apparatus is placed at the window of the building and the object is placed on the apparatus, a sum of the outward force exerted by the adjustable first member on the interior surface of the building and the forces exerted by the continuous second member and the continuous third member on the exterior surface of the building are sufficient to oppose the downward force of the object.

7. The apparatus of claim 5 wherein, when the apparatus is placed at the window of the building and the object is placed on the apparatus, a sum of the outward force exerted by the adjustable first member on the interior surface of the building and the forces exerted by the continuous second member and the continuous third member on the exterior surface of the building are sufficient to support the object at the window.

8. The apparatus of claim 5 further comprising at least one support configured to extend across the continuous second member and configured to further support the object.

* * * * *